I. R. KERN.
PLOW.
No. 188,018. Patented March 6, 1877.
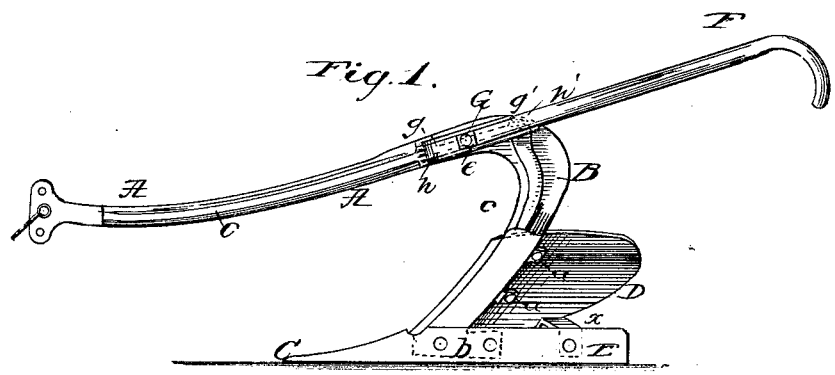
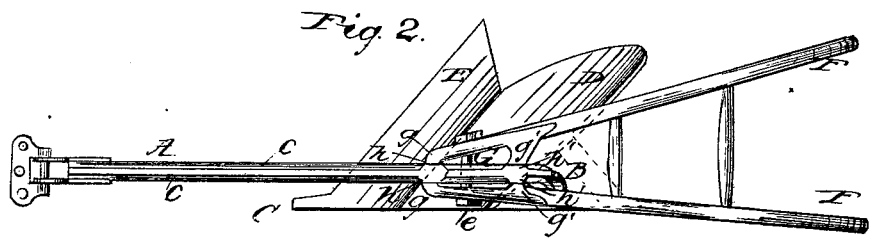
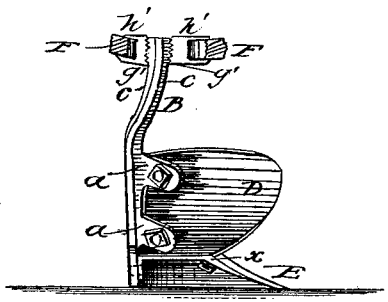
Witnesses.
Fred G. Dieterich
W. E. Chaffee
Inventor.
Isaac R. Kern
By DeWitt C. Allen
Atty.

UNITED STATES PATENT OFFICE.

ISAAC R. KERN, OF BLOOMINGTON, ILLINOIS.

IMPROVEMENT IN PLOWS.

Specification forming part of Letters Patent No. 188,018, dated March 6, 1877; application filed February 8, 1877.

*To all whom it may concern:*

Be it known that I, ISAAC R. KERN, of Bloomington, in the county of McLean and State of Illinois, have invented certain new and useful Improvements in Plows; and I do hereby declare that the following is a full, clear, and exact description thereof, reference being made to the accompanying drawing, forming a part of this specification, and in which—

Figure 1 is a side view. Fig. 2 is a top view. Fig. 3 is a rear view.

This invention relates to improvements upon a former patent granted to me May 9, 1876, No. 177,254; and the invention consists in the construction and arrangement of the several devices, as will be hereinafter fully described, and pointed out in the claims.

A in the drawing represents the beam of the plow, and B the standard, both the beam and standard being cast or wrought in one piece, and with ears $a\ a$ and flange $b$, to which the mold-board and land-side are bolted. The beam and standard are made flat or oval in shape, and provided with a rib, $c$, on each side.

The object of constructing the beam and standard in the manner above described is to make it both light and strong, and the rib $c$ on each side to give them lateral strength.

In my former patent before referred to the standard B was made to curve forward in a regular circle from the mold-board to the beam, and the lateral curve of the standard commenced to curve about midway of the mold-board and beam, while in my present invention the standard is not as regular in its curve forward, but is more sudden as it approaches the top of the standard, and the lateral curve commencing to curve at once from the top of the mold-board, as clearly shown in Fig. 3 of the drawing, which more readily clears the mold-board, or throws off the trash, weeds, and straw, which would be liable to collect upon it. It will also be observed that by making the curve of the standard irregular I am enabled to secure the handles farther back upon the beam than if the curve were regular, as in my former patent above referred to. D represents the mold-board, E the land-side, and C the point. $x$ represents a brace interposed and bolted to the mold-board and land-side. F F represent the handles, the forward ends of which are pivoted to the rear of the beam A by the bolt G. The inner forward ends of the handles are provided with two series of horizontal teeth and corrugations, $g$ and $g'$, which mesh with two corresponding series of horizontal teeth and corrugations, $h$ and $h'$, upon both sides of the beam A.

By the above-described construction of the handles and beam the handles can be raised and lowered to suit the height of different persons, as desired, by simply loosening the nut $e$ on the bolt G, which, in connection with the horizontal teeth and corrugations, secures the handles in any desired position when the nut is screwed tight upon the bolt.

It will be perceived that the right handle stands off from the beam in the rear thereof more than the left handle. If desired, for a left-hand plow (mold-board on the left side of the standard) the handles can be reversed, so that the one with the greatest inclination can be put on the left side.

The object of arranging the handles as above described is to enable the operator to walk directly in the furrow, and immediately behind the plow.

I claim as my invention—

1. The combination, with the handles and mold-board and land-side of a plow, of the beam and standard, constructed of one piece of metal, made flat or oval, and having the rib $c$ on each side thereof, said standard being made smooth to the top of mold-board, curved irregularly forward, and curved laterally from the top and over the mold-board, all as herein shown and described, and for the purpose specified.

2. The combination, with the bolt and nut G $e$, or their equivalents, of the handles having the series of horizontal teeth and corrugations $g\ g'$, and the beam having the series of corresponding teeth and corrugations $h\ h'$ upon each side thereof, whereby the handles can be raised and lowered, and secured in any desired position, substantially as and for the purpose specified.

ISAAC R. KERN.

Witnesses:
THOS. SLADE,
W. P. McMURRY.